Patented Apr. 19, 1949

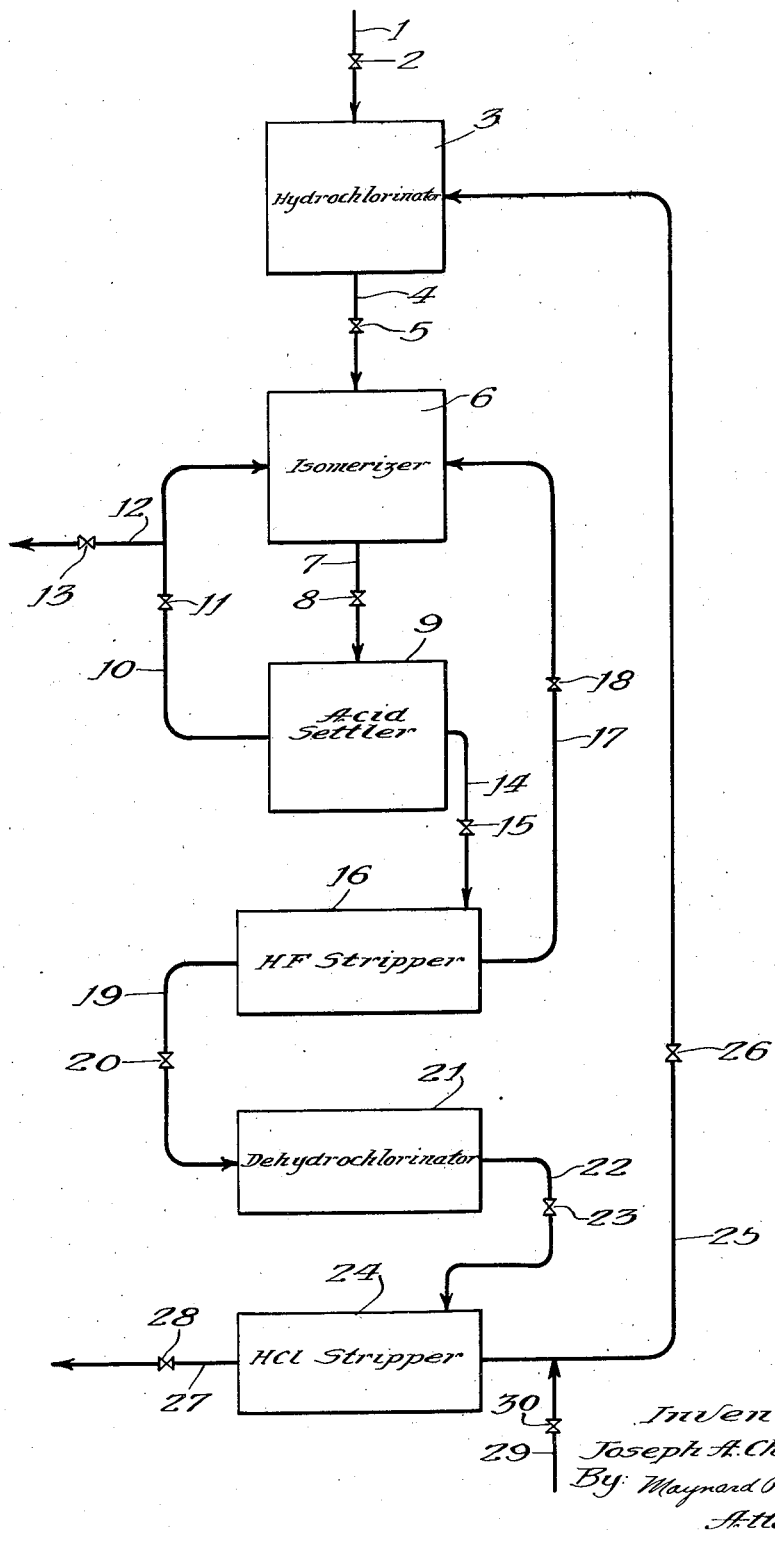

2,467,965

UNITED STATES PATENT OFFICE 2,467,965

ISOMERIZATION OF ALKYL HALIDES

Joseph A. Chenicek, Riverside, Ill., assignor to Universal Oil Products Company, Chicago, Ill., a corporation of Delaware Application January 30, 1946, Serial No. 644,401

11 Claims. (Cl. 196—78)

1

This invention relates to the catalytic isomerization of alkyl halides. It is more particularly concerned with the treatment of alkyl halides containing at least three carbon atoms with fluorine-containing isomerization catalysts at isomerizing conditions. It is also concerned with a process for improving the quality of cracked gasolines.

Alkyl halides have been produced in a number of ways. Generally, they are produced directly from hydrocarbons, as by the chlorination of paraffin hydrocarbons or by the addition of hydrogen halides such as hydrogen chloride to olefinic hydrocarbons. Satisfactory yields of alkyl halides also have been obtained from the treatment of alcohols with highly reactive halogen compounds such as phosphorus halides, antimony halides, and the like, or by treating them with hydrogen halides in the presence of strong oxygen-containing mineral acids. The degree of halogenation in some cases depends upon the character of the hydrocarbon and the operating conditions such as contact time, temperature, and the concentration of the reactants. I am principally interested in the monohalogen derivatives of hydrocarbons.

When alkyl halides are formed by the addition of hydrogen halide to olefin mixtures or by the limited halogenation of paraffin mixtures, primary, secondary, and tertiary alkyl halides are produced. However, because certain of the types of alkyl halides are relatively more desirable than the others, it has been found necessary to augment their supply. This can be accomplished by the use of my invention by isomerizing those alkyl halides for which there is less demand to their more valuable counterparts.

In one embodiment my invention consists of a process for the isomerization of alkyl halides which comprises subjecting an alkyl halide containing more than two carbon atoms to the action of a fluorine-containing isomerization catalyst under isomerizing conditions.

Attempts to improve the quality of cracked gasoline, particularly thermally cracked gasoline, by treatment with metal halide and mineral acid catalysts have met with negligible success because of the extensive cracking and hydrogen transfer reactions which occur. By the use of my invention, the antiknock rating of cracked gasoline can be improved without the simultaneous occurrence of extensive side reactions.

In a specific embodiment my invention consists of a process for the treatment of cracked gasoline which comprises contacting a cracked gasoline with a hydrogen halide under hydrohalogenating conditions, separating a mixture comprising the alkyl halides thus produced and unconverted hydrocarbons from the hydrogen halide, subjecting said mixture to the action of a fluorine-containing isomerization catalyst under isomerizing conditions, separating the isomerate from the isomerization catalyst, subjecting said isomerate to the action of a dehydrohalogenating catalyst under dehydrohalogenating conditions, separating hydrogen halide from the effluent of the last named step, and recycling said hydrogen halide to the hydrohalogenation step.

The alkyl halides used in my process may be fluorides, chlorides, bromides, and iodides, but, in general, the fluorides are somewhat less susceptible to isomerization than the other halides. The halide should contain at least three carbon atoms because methyl and ethyl halides, which contain 1 and 2 carbon atoms respectively, are not capable of undergoing isomerization. The alkyl halide may be primary, secondary, tertiary, or a mixture thereof. The limiting composition of the product in all cases will be the equilibrium mixture. Examples of suitable compounds are n-propyl bromide, tertiary butyl chloride, secondary butyl fluoride, n-amyl iodide, and 2-chloro-octane.

Fluorine-containing isomerization catalysts may be used which effect intramolecular rearrangement in alkyl halides containing more than three carbon atoms. The rearrangement may consist of a change in the carbon structure, a migration of the halogen atom, of both. Suitable catalysts include anhydrous hydrogen fluoride; hydrogen fluoride+boron trifluoride; fluosulfonic acid; hydrogen fluoride+a metal salt such as potassium fluoride; hydrogen fluoride+a nonoxidizing acid, ester, or acid anhydride; boron trifluoride+fluosulfonic acid; boron trifluoride+an acid fluoride such as potassium acid fluoride; hydrogen fluoride+hydrogen cyanide; hydrogen fluoride+a low boiling fluoride or oxyfluoride selected from the group consisting of the fluorides or oxyfluorides of sulfur, selenium, nitrogen, phosphorus, molybdenum, titanium, vanadium, silicon, and tungsten; hydrogen fluoride+hydroxyfluoboric acid; boron trifluoride+nickel+hydrogen fluoride; and boron trifluoride+nickel+water+hydrogen fluoride.

The process of my invention may be carried out using either batch or continuous operation. In a simple batch procedure proportionate amounts of the alkyl halide and the fluorine-containing isomerization catalyst may be added to a reaction vessel and the contents heated and agitated for a time adequate to cause the desired degree of conversion. After a period of heating, the reaction vessel may be cooled, the contents discharged, and a separation effected between the alkyl halides and the catalyst. This type of operation can readily be converted to a continuous basis by continuously charging regulated amounts of alkyl halide and catalyst to the reaction vessel, and simultaneously withdrawing regulated amounts of isomerate and catalyst from said vessel. A continuous separation can be made between the catalyst and the isomerate, and the former may then be recycled to the reaction vessel. Part of the used catalyst may be sent to regeneration means to remove the organic contaminants which tend to accumulate in said phase during the reaction.

The optimum conditions used for the isomerization reaction will depend upon the particular halide and catalyst used, but, in general, the temperature will be in the range of from about −50° C. to about +150° C., the contact time will be from about 5 to about 100 minutes, the pressure will be sufficient to maintain the alkyl halide and the catalyst in the liquid phase, and the relative proportions of alkyl halide and catalyst will be such that two distinct phases exist in the reaction zone.

The attached diagrammatic sketch illustrates in conventional side elevation one type of apparatus in which one of the objects of my invention may be accomplished. This object is the improvement of the anti-knock quality of a cracked gasoline. In order to simplify the explanation of the drawing, it is being considered in connection with the hydrochlorination of a full boiling range thermally cracked gasoline and the isomerization of the alkyl chlorides in the presence of anhydrous hydrogen fluoride with subsequent dehydrochlorination. It is not intended, however, that this simplification should unduly limit the generally broad scope of the invention.

Referring to the drawing, a cracked gasoline containing olefins is introduced through line 1 containing valve 2 into hydrochlorinator 3, wherein hydrogen chloride is reacted with the olefins in the gasoline to form alkyl chlorides. This reaction may be carried out in the liquid or vapor phase and in the presence or absence of contact agents. Among the agents which may be used to catalyze this reaction are adsorptive materials, such as activated carbon, which have a microporous structure, and adsorptive metal oxide gels prepared by partially dehydrating hydrogel or gelatinous precipitates. This reaction is usually carried out at atmospheric temperature but temperatures as low as −80° C. and as high as 100° C. may be employed. The alkyl chlorides and the unconverted hydrocarbons are separated from the hydrogen chloride by means such as a settler or fractionator not shown in the drawing. The chlorides and hydrocarbons are passed through line 4 containing valve 5 into isomerizer 6, wherein the mixture is contacted with anhydrous hydrogen fluoride under isomerizing conditions. A substantial portion of the alkyl halides are converted to more highly branched isomers thereof. The effluent from isomerizer 6 is passed through line 7 containing valve 8 into acid settler 9, wherein a fraction comprising chiefly hydrogen fluoride is separated from the fraction comprising chiefly alkyl chloride and hydrocarbons. The catalyst layer is withdrawn through line 10 containing valve 11 and the bulk of it is returned to isomerizer 6. A portion of it may be withdrawn through line 12 containing valve 13 and sent to a regeneration means wherein organic contaminants which accumulate in the catalyst phase during the reaction are removed. The alkyl halide-hydrocarbon fraction from settler 9 is withdrawn through line 14 containing valve 15 and is passed into hydrogen fluoride stripper 16. Hydrogen fluoride is removed therefrom as an overhead product through line 17 containing valve 18 and is returned to isomerizer 6. The bottoms from stripper 16 are withdrawn through line 19 containing valve 20 and are passed into dehydrochlorinator 21, which may be packed with any of the known dehydrochlorinating catalysts, such as bauxite, barium chloride, various clays, etc. In this vessel the alkyl chlorides are decomposed into olefins and hydrogen chloride. The effluent from dehydrochlorinator 21 is passed through line 22 containing valve 23 into hydrogen chloride stripper 24. Hydrogen chloride is removed as an overhead product therefrom, and is returned to hydrochlorinator 3 through line 25 containing valve 26. Makeup hydrogen chloride may be added through line 29 containing valve 30. The bottoms product from stripper 24 comprises olefin-containing cracked gasoline of higher octane number than that charged to the process, and is withdrawn through line 27 containing valve 28 and sent to storage.

Pumps, condensers, receivers, and the like, have been omitted from the drawing for the sake of simplicity, but it is to be understood that they are to be used wherever needed.

The following example is given to illustrate the results that can be obtained by the use of this invention, but it is not intended to limit the generally broad scope of the invention.

*Example I*

One-hundred and sixty-nine grams of secondary butyl chloride and 190 grams of anhydrous hydrogen fluoride were charged to a turbomixer and agitated for 30 minutes. The temperature was 75° F. at the beginning of the run and 100° F. at the end. The pressure was sufficiently high to maintain the alkyl chloride and the catalyst in the liquid phase. The contents of the bomb were demoved at the end of the run, a separation was effected between the alkyl halides and the acid, and the former was then analyzed. The analysis showed that 8.2% of the secondary butyl chloride had been converted to tertiary butyl chloride. In addition, some high boiling material had been produced in the reaction. Therefore, the ultimate or recycle yield of tertiary butyl chloride is somewhat less than 100%.

I claim as my invention:

1. A process for the production of tertiary alkyl halides which comprises subjecting a nontertiary alkyl halide containing more than 2 carbon atoms to the action of a catalyst predominating in substantially anhydrous hydrogen fluoride under isomerizing conditions.

2. The process of claim 1 further characterized in that the catalyst comprises boron fluoride in addition to the substantially anhydrous hydrogen fluoride.

3. A process for the production of tertiary alkyl halides which comprises subjecting a nontertiary alkyl halide containing more than 2 carbon atoms to the action of a catalyst predominating in substantially anhydrous hydrogen fluoride, at an isomerization temperature and under a pressure sufficient to maintain a substantial portion of the reactants and the catalyst in the liquid phase.

4. The process of claim 3 further characterized in that the catalyst comprises boron fluoride in addition to the substantially anhydrous hydrogen fluoride.

5. A process for the production of tertiary alkyl chlorides which comprises subjecting a nontertiary alkyl chloride containing more than 2 carbon atoms to the action of a catalyst predominating in substantially anhydrous hydrogen fluoride under isomerizing conditions.

6. The process of claim 5 further characterized in that the catalyst comprises boron fluoride in addition to the substantially anhydrous hydrogen fluoride.

7. A process for the treatment of cracked gasoline which comprises contacting a cracked gasoline with hydrogen chloride under hydrochlorinating conditions to form alkyl chlorides in the gasoline, subjecting the gasoline containing alkyl chlorides to the action of an isomerization catalyst predominating in hydrogen fluoride under isomerizing conditions to isomerize at least a portion of said alkyl chlorides, separating the isomerate from the isomerization catalyst, subjecting said isomerate to the action of a dehydrochlorinating catalyst under dehydrochlorinating conditions, separating hydrogen chloride from the effluent of the last named step, and recycling said hydrogen chloride to the hydrochlorination step.

8. The process of claim 7 further characterized in that the isomerization catalyst comprises substantially anhydrous hydrogen fluoride and boron fluoride.

9. A process for the production of a tertiary alkyl halide which comprises subjecting a secondary alkyl halide under isomerizing conditions to the action of a catalyst predominating in substantially anhydrous hydrogen fluoride.

10. A process for the production of a tertiary butyl halide which comprises subjecting a secondary butyl halide under isomerizing conditions to the action of a catalyst predominating in substantially anhydrous hydrogen fluoride.

11. A process for the production of tertiary butyl chloride which comprises subjecting secondary butyl chloride under isomerizing conditions to the action of a catalyst predominating in substantially anhydrous hydrogen fluoride.

JOSEPH A. CHENICEK.

REFERENCES CITED

The following references are of record in the file of this patent:

UNITED STATES PATENTS

| Number | Name | Date |
| --- | --- | --- |
| 1,102,655 | Graul | July 7, 1914 |
| 1,202,282 | Graul | Oct. 24, 1916 |
| 1,885,060 | Hofman et al. | Oct. 25, 1932 |
| 2,164,334 | Marks | July 4, 1939 |
| 2,374,819 | Kanhofer et al. | May 1, 1945 |
| 2,412,726 | Frey | Dec. 17, 1946 |

FOREIGN PATENTS

| Number | Country | Date |
| --- | --- | --- |
| 535,435 | Great Britain | Apr. 9, 1941 |

OTHER REFERENCES

Richter's Organic Chemistry, translated by Spielmann, page 92 (P Blakiston's Son, 1921).

Simons et al., "Jour. Am. Chem. Soc.," vol. 60, pages 2267–2269 (1938).

Wiechert, "Die Chemie," vol. 56, pages 338–339 (1943).